United States Patent

Wilson

[15] 3,699,875
[45] Oct. 24, 1972

[54] APPARATUS FOR PRESERVING DELICATE FOOD PRODUCTS

[72] Inventor: Donald C. Wilson, San Jose, Calif.

[73] Assignee: FMC Corporation, San Jose, Calif.

[22] Filed: May 3, 1971

[21] Appl. No.: 139,648

[52] U.S. Cl. .......................99/249, 99/214, 99/362
[51] Int. Cl. ...........................................B65b 55/06
[58] Field of Search........99/249, 251, 252, 271, 270, 99/272, 273, 359, 360, 361, 362, 363, 364, 365, 367, 370, 214

[56] References Cited

UNITED STATES PATENTS

| 1,419,139 | 6/1922 | Hunter | 99/362 |
| 1,843,522 | 2/1932 | Sprague | 99/272 |
| 2,660,512 | 11/1953 | Webster | 99/362 |
| 2,968,232 | 1/1961 | Carvallo | 99/360 |
| 3,407,721 | 10/1968 | Carvallo | 99/249 |

Primary Examiner—Robert W. Jenkins
Attorney—F. W. Anderson, C. E. Tripp and J. W. Edwards

[57] ABSTRACT

Delicate food products having substances that become volatile when subjected to sterilization heat can be preserved in flexible containers without loss of aroma or flavor by expelling air at room temperature from the food product and container, then sealing the container and sterilizing the product therein. Each container is filled with a food product and has an opening through which gases can be expelled while preventing liquid from entering. These containers are advanced by a conveyor through a liquid filled leg in an enclosed housing towards a vacuum chamber and, as pressure decreases outside the container, higher pressure gases within the container are expelled through the container opening. Hydrostatic pressure of the liquid within the leg prevents the container from swelling up in balloon fashion and, as the container moves towards the vacuum, pressure outside the container gradually decreases. By the time the container reaches the vacuum, substantially all air is expelled from the container. Processing apparatus includes a vacuum chamber with a liquid filled leg through which a conveyor is adapted to travel, a sealer within the vacuum chamber for sealing containers passing through, and a hydrostatic cooker through which the conveyor passes for sterilizing food products in the sealed containers.

7 Claims, 5 Drawing Figures

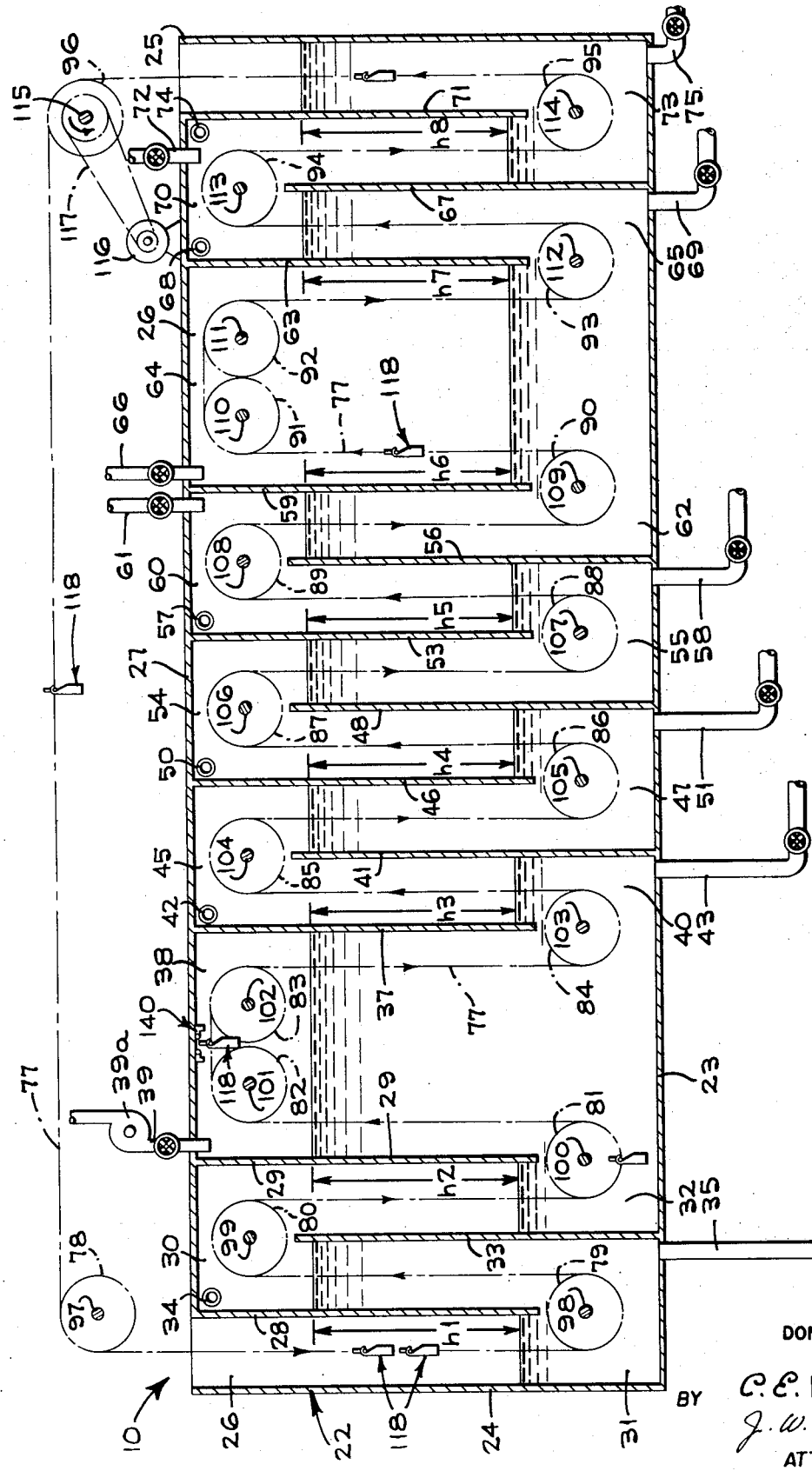

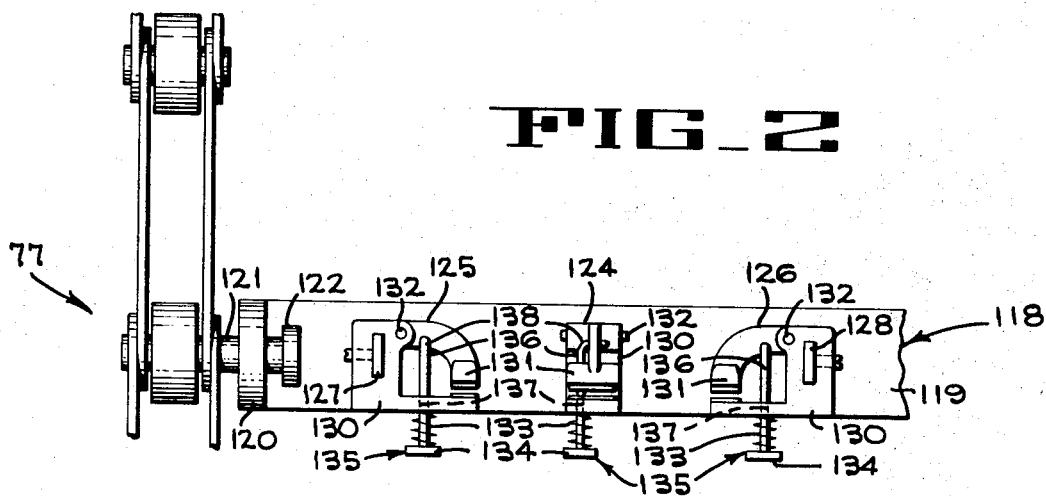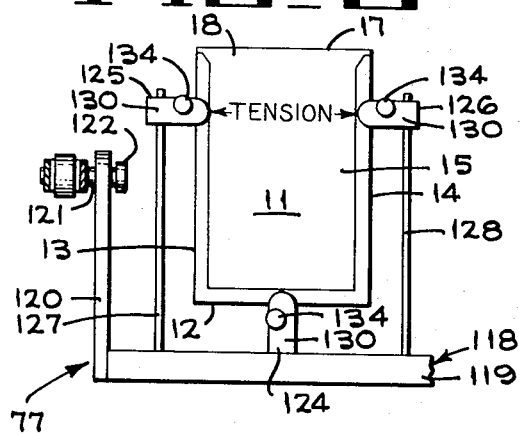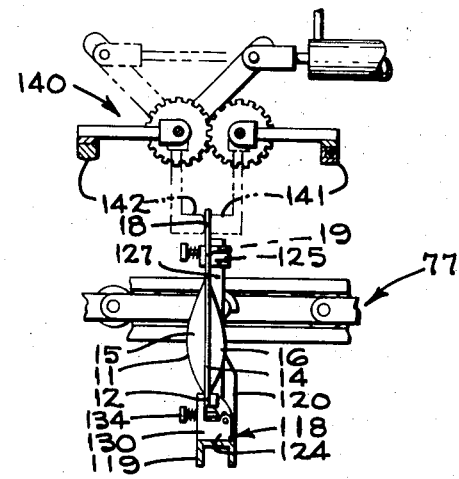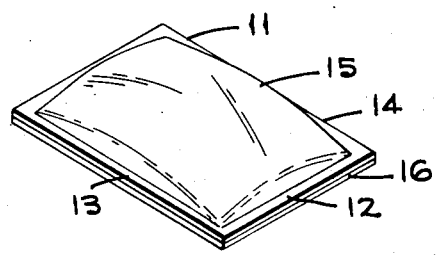

3,699,875

APPARATUS FOR PRESERVING DELICATE FOOD PRODUCTS

CROSS REFERENCE TO RELATED PATENT

The method and apparatus of the present invention is a modification of the method and apparatus disclosed in U.S. Pat. No., 3,501,318 by the same inventor and assigned to the same assignee. The disclosure of that patent is incorporated herein by reference and particular attention will be directed to specific portions thereof in the following description.

BACKGROUND OF THE INVENTION

1. Field of the Invention

This invention relates to an improved method and apparatus for preserving delicate food products and beverages without loss of flavor or aroma. More particularly, the method concerns expelling air at normal temperature from flexible containers filled with a food product, sealing the containers, and sterilizing the product therein. The apparatus for carrying out this method includes the combination of an exhauster, a sealer, and a hydrostatic cooker.

2. Description of the Prior Art

When preserving food products, it is necessary to expell headspace air, interstitial air within a product and air dissolved in the product or packaging medium before containers are sealed to prevent subsequent oxidation of the product. Air purging methods disclosed in U.S. Pat. No. 3,501,318 include the step of sterilizing a food product by heating in an unsealed flexible container. The sterilization heat causes the formation of aqueous vapors within the container and these vapors together with other gases are expelled therefrom through a one-way valve. A problem is encountered when preserving delicate food products in this manner. Some food products have substances that become volatile when heated to sterilization temperature and the flavor or aroma is lost with vapors and gases that are expelled.

Apparatus for expelling air at room temperatures from a food product and container must also be suitable for continuous operation with other processing equipment such as a sealer for sealing the container and a hydrostatic cooker for sterilizing the product therein. Running a conveyor continuously through a vacuum chamber presents problems in sealing the vacuum chamber and maintaining the desired vacuum.

SUMMARY OF THE INVENTION

Delicate foods and beverages can be preserved within flexible containers without loss of flavor or aroma by expelling air therefrom at room temperature or temperatures below room temperature, then sealing the containers and sterilizing the product therein. The containers have an opening that forms a one-way valve through which air can be expelled while preventing liquid from entering therein. A conveyor advances these containers through a liquid filled leg in an enclosed housing that forms a hydrostatic seal for a vacuum chamber. As pressure outside a container decreases, gases within the container at higher pressure are expelled through the one-way valve. By the time the container reaches the vacuum chamber, substantially all of the gases are expelled and the container is sealed by a sealer located within the vacuum chamber. The conveyor then carries the sealed container through a hydrostatic cooker for sterilizing the product while preserving volatile substances within the sealed container.

BRIEF DESCRIPTION OF THE DRAWING

FIG. 1 is a diagrammatic vertical central section of an enclosed housing including an exhauster, sealer and hydrostatic cooker for practicing the present invention.

FIG. 2 is an enlarged plan illustrating a fragment of the conveyor and a carrier with container supporting clamps thereon.

FIG. 3 is a front elevation of a fragment of a carrier and a filled flexible container with three edges sealed and the upper end open, said view illustrating the manner of tensioning the upper portion of the container to provide a one-way valve.

FIG. 4 is a reduced side elevation of the carrier and container shown in FIG. 3 also illustrating the operation of the sealer for sealing the upper open end of the container.

FIG. 5 is a perspective of a flexible container after being sealed and sterilized.

DESCRIPTION OF THE PREFERRED EMBODIMENT

As illustrated in FIG. 1, a processing apparatus 10 is provided to continuously expell air at room temperature from products filled in flexible containers or pouches 11 (FIGS. 3–5), and to then seal the containers and sterilize the product therein. The flexible containers are preferably made of a heat sealable, laminated film having an outer layer formed of a polyester resin film, a central layer of thin aluminum, and an inner layer of polyethylene. Prior to being filled, the lower edge 12 and side edges 13 and 14 of side walls 15 and 16 of the container are hermetically sealed by application of heat and pressure to provide a flat container having an unsealed or open upper end portion 17 which defines the mouth 18 (FIGS. 3 and 4) of the container, a one-way valve 19 is formed in the mouth of the container as will be described hereinafter.

Processing apparatus 10 (FIG. 1) includes a housing 22 defined by a bottom 23, end walls 24 and 25, side walls 26 (only one of which is shown), and a top 27 all of which are secured together in fluid tight relationship as by welding. A pair of baffles 28 and 29 depend from the top and extend between the side walls to define an auxiliary vacuum chamber 30 which is sealed by liquid within an inlet leg 31 and a second leg 32.

Inlet leg 31 is formed between end wall 24 and baffle 28 and continues between baffle 28 and a baffle 38, extending upward from the bottom of the housing, to provide communication with auxiliary vacuum chamber 30. The inlet leg has an effective hydrostatic height $h_1$ indicated in the drawing, representing the difference between the levels of liquid therein which seals the auxiliary vacuum chamber from the atmosphere. A fluid inlet 34 and a valved drain conduit 35 are provided to maintain a desired amount of liquid within the liquid leg. Second leg 32 is formed between baffle 33 and baffle 29 and continues upwardly between baffle 29 and a baffle 37 that depends from top 27. The second leg has an effective hydrostatic height $h_2$ as indicated in the drawing.

A main vacuum chamber 38 is formed between baffles 29 and 37 and sealed by liquid in second leg 32 and a third leg 40. A valved vacuum line 39 with vacuum pump 39a is provided to maintain a desired amount of vacuum within vacuum chamber 38. By placing a vacuum in the chamber 38 a partial vacuum will be achieved in vacuum chamber 30 as the liquid level drops in the leg 32. Third leg 40 is formed between baffles 29 and 37 (coextensive with the terminal portion of the second leg 32) and continues between baffle 37 and a baffle 41 that projects upwardly from bottom 23. The third leg has an effective hydrostatic height $h_3$ as indicated in the drawing. A fluid inlet 42 and a valved drain conduit 43 are provided to maintain a desired amount of liquid in both the second and third legs and thereby adjust the level of the intermediate vacuum in the auxiliary vacuum chamber 30.

A second auxiliary vacuum chamber 45 is formed between baffle 37 and a baffle 46 that depends from top 27. This vacuum chamber is sealed by liquid in both third leg 40 and a fourth leg 47, and the amount of vacuum therein is created by the vacuum in the chamber 38 which causes the level of the liquid in the fourth leg to drop. The fourth leg is formed between baffles 41 and 46 and continues between baffle 46 and a baffle 48 extending upward from bottom 23. The fourth leg has an effective hydrostatic height $h_4$ and liquid is supplied thereto through an inlet 50 and removed therefrom through a valved drain conduit 51.

A baffle 53 depends from top 27 and a chamber 54 is formed between baffles 46 and 53. Pressure within this chamber is normally at atmospheric level. A fifth leg 55 having an effective hydrostatic height $h_5$ is formed between baffles 48 and 53 and continues between baffle 53 and a baffle 56 that projects upward from bottom 23. Liquid is supplied to the fifth leg through an inlet 57 and removed through a valved drain conduit 58.

A baffle 59 depends from top 27 and an auxiliary pressure chamber 60 is formed between baffles 53 and 59. Steam under pressure is directed into the auxiliary pressure chamber through a valved conduit 61. This chamber is sealed by liquid in fifth leg 55 and a sixth leg 62, formed between baffles 56 and 59. The sixth leg has an effective hydrostatic height $h_6$ and continues upward between baffle 59 and a baffle 63 depending from top 27.

A sterilizing chamber 64, formed between baffles 59 and 63, is sealed by liquid in sixth leg 62 and a seventh leg 65. Steam under pressure is directed into the sterilizing chamber through a valved conduit 66. The seventh leg is formed between baffles 59 and 63 and continues upward between baffle 63 and a baffle 67 projecting upward from bottom 23. The seventh leg has an effective hydrostatic height $h_7$. Liquid is fed to both the sixth and seventh legs, which have a coextensive portion defining the bottom of the sterilizing chamber 64, from an inlet 68 and removed therefrom through a valved drain conduit 69.

An auxiliary pressure chamber 70 is formed between baffle 63 and a baffle 71 that depends from top 27. Pressure within this chamber is controlled by a valved conduit 72 supplying compressed air thereto and the chamber is sealed by liquid in seventh leg 65 and an outlet leg 73. The outlet leg is formed between baffles 67 and 71 and continues upward between baffle 71 and end wall 25, having an effective hydrostatic height $h_8$.

Liquid is fed to the outlet leg through an inlet 74 and removed therefrom through a valved drain conduit 75.

The water in fifth leg 55 and sixth leg 62 is thermostatically controlled to provide increasing water temperatures in the transfer legs from approximate room temperature in chamber 54 to a sterilizing temperature in the range of 160°–250° F for most food products to be processed in sterilizing chamber 64. It will be understood that the sterilizing chamber and the hydrostatic legs sealing the chamber are formed by a regular hydrostatic cooker unit having the normal temperature-pressure range capabilities. Seventh leg 65 and outlet leg 73 are thermostatically controlled to provide decreasing water temperatures in the transfer legs from the sterilizing chamber to any suitable temperature below the boiling point of the liquid in the container at atmospheric pressure.

And endless conveyor 77 is provided for carrying the pouches 11 through the various aforedescribed chambers which conveyor comprises a pair of parallel endless chains, and details of the construction of the conveyor are disclosed in U.S. Pat. No. 3,501,318 at column 4, lines 46–69, with reference to FIGS. 2, 3 and 4 of that patent. As shown in the drawings of the present application, the endless conveyor is trained about successively arranged sprockets 78, 79, 80, 81, 82, 83, 84, 85, 86, 87, 88, 89, 90, 91, 92, 93, 94, 95 and 96 which are keyed to shafts 97, 98, 99, 100, 101, 102, 103, 104, 105, 106, 107, 108, 109, 110, 111, 112, 113, 114 and 115, respectively. A motor 116 is operatively connected to shaft 115 by a drive chain 117 and continuously drives conveyor 77 in the direction indicated in FIG. 1.

Endless conveyor 77 includes a plurality of uniformly spaced container carriers 118 (FIGS. 2, 3 and 4) for supporting flexible containers 11. While only a portion of one container carrier is shown, it will be understood that each container carrier can support a row of flexible containers as shown in U.S. Pat. No. 3,501,318. Each carrier comprises a channel 119 with projecting arms 120 welded to opposite ends thereof. A hook is provided on the upper end of each arm for attachment to the pair of parallel endless chains which form the endless conveyor. Alternate pivot pins 121 of the endless chains are axially aligned and project inwardly from the chains for supporting the hooked arms of the container carriers, while enlarged heads 122 are provided on the inner ends of the pivot pins to retain the hooked arms thereon.

Each flexible container 11 is connected to one of the carriers 118 by a clamp 124 that grips the lower edge 12 to prevent flotation of the container when submerged and by clamps 125 and 126 which grip the side edges 13 and 14 of the container adjacent mouth 18. Clamps 125 and 126 are mounted near the upper ends of bars 127 and 128 that are mounted on the channel 119 and are resiliently stressed to apply a tensioning force across mouth 18 of the container to provide a one-way valve 19 (FIG. 4). A tensioning force of between about ½ to about 1½ pounds has been found to be desirable when a laminated flexible container that is about 5 inches wide is being processed.

As best shown in FIG. 2, clamps 124, 125 and 126 each have a body 130 fastened to channel 119, bar 127 or bar 128, respectively, as by bolting. A clamping jaw 131 is pivotally connected to the body by a pin 132 and is urged into gripping engagement with container 11 by a compression spring 133 fitted between the body and an enlarged head 134 on a jaw actuating lever 135. The jaw actuating lever includes a plunger 136 which is slidably received in an opening 137 within the body and has an upper pivot portion 138 bent at right angles to the remainder of the plunger which extends through a hole in jaw 131.

When it is desired to clamp a filled flexible container 11 to one of the carriers 118, plungers 136 of three associated clamps 124, 125 and 126 are depressed, opening jaws 131 thereof and permitting the appropriate edges of the flexible container to be placed between the jaws and the bodies 130 of the clamps. The plungers are then released permitting springs 133 to urge the jaws into firm gripping engagement with the container. The resilience of bars 127 and 128 provides the necessary tensioning forces across mouth 18 of the container, as indicated in FIG. 3, to provide a one-way valve that allows gases to be discharged from the container but prevents fluids from entering therein.

A sealing mechanism 140 (FIGS. 1 and 4) is located within vacuum chamber 38 for sealing each container 11 passing through the vacuum chamber. The sealing mechanism includes an electrically heated sealing bar 141 and a cooperating pressure resisting anvil 142. The sealing bar is preferably heated to about 320° F, and, during the sealing operation, the sealing bar and anvil pivot together, as indicated in phantom lines in FIG. 4, on opposite sides of container mouth 18 which is subjected to a sealing pressure of about 150 p.s.i. for about 1½ seconds. Details of the construction of the sealing mechanism are disclosed in U.S. Pat. No. 3,501,318 at column 5, line 43 through column 6, line 18, with reference to FIGS. 5 and 6 of that patent.

In carrying out the process of the present invention, filled flexible containers 11 with their upper ends unsealed are clamped to a carrier 118 in a manner tensioning the unsealed upper ends to form one-way valves, and the carrier is then attached to the continuously driven conveyor 77 (at the upper left hand corner of the conveyor as shown in FIG. 1) for movement through apparatus 10 in the direction indicated by the arrows in FIG. 1.

When a flexible container 11 enters the liquid within inlet leg 31, hydrostatic pressure expells head-space air from the container. As the container advances upward between baffles 28 and 33, through auxiliary vacuum chamber 30 and second leg 32, interstitial air and dissolved air within the product is expelled due to the fact that pressure outside the container is less than atmospheric level. Hydrostatic pressure prevents the container from swelling like a balloon and the pressure drops progressively as the container advances. When the container reaches main vacuum chamber 38, substantially all air should be expelled therefrom without rupturing or foaming the product. In order to prevent the desirable aromas and flavors from boiling off as the pressure is reduced in the vacuum chambers, it may be necessary to reduce the temperature in the vacuum chambers to temperatures below room temperature for some products. Obviously, the temperatures cannot be lower than the freezing point of the liquid in the hydrostatic legs although liquids other than water and with a lower freezing point might be used in the legs if it should prove necessary to maintain low temperatures in order to prevent the evaporation of the desirable aromas in the product. The reduced temperatures in the first, second and third legs can be achieved by conventional refrigerating coils.

The open mouth 18 of container 11 is sealed within vacuum chamber 38 by sealing mechanism 140. Sealed containers then advance through third leg 40 and fourth leg 47 as the external pressure builds back up to atmospheric level.

As the sealed containers 11 continue through fifth leg 55, auxiliary pressure chamber 60 and sixth leg 62, temperature and pressure build up to a desired degree for sterilization of the product being processed. Such temperature and pressure are maintained in sterilization chamber 64 as the containers advance through at a rate that provides a desired dwell time for sterilization. Since the containers are sealed, volatile substances contributing to flavor or aroma of the food product can not escape. Then the containers are cooled as they pass through seventh leg 65, auxiliary pressure chamber 70 and outlet leg 73. Processed containers are removed from conveyor 77 and replaced by filled but unsealed containers to be processed.

Auxiliary vacuum chambers 30 and 45 are provided for maintaining a desired high vacuum within vacuum chamber 38, while limiting the height of the hydrostatic legs. It will be seen that the pressure within vacuum chamber 38 equals atmospheric pressure minus the head represented by $h_1 + h_2$. A single leg of a height equal to $h_1 + h_2$ or $h_3 + h_4$ might be too tall for convenience but would function in the same manner. Thus, it will be seen that the legs sealing the vacuum chamber can be divided into any desired number each having a desired hydrostatic height which heights are combined to produce the required transfer head.

Conveyor 77 could enter and exit vacuum chamber 38 through the same legs but for illustration simplification, legs 31 and 32 are shown for entry while legs 40 and 47 are provided for exit.

Although the best mode contemplated for carrying out the present invention has been herein shown and described, it will be apparent that modification and variation may be made without departing from what is regarded to be the subject matter of the invention.

I claim:

1. Processing apparatus comprising means defining a vacuum chamber, means for reducing the pressure within said chamber to a predetermined sub-atmospheric level, means defining a liquid filled leg in communication with the vacuum chamber and extending downward therefrom; said leg having an effective vertical height of liquid therein to form a pressure seal balancing the less than atmospheric pressure within the vacuum chamber against the higher external pressure at the end of the liquid filled leg farthest from the vacuum chamber; and a conveyor adapted to travel continuously through said leg and vacuum chamber for advancing articles to be processed therein.

2. The processing apparatus described in claim 1 wherein said article to be processed include food products in partially filled flexible containers each having an opening therein, means for mounting said containers upon said conveyor so that liquid is prevented from entering therein while gases are permitted to be expelled therefrom; said conveyor being arranged to advance containers through the liquid filled leg towards the less then atmospheric pressure within the vacuum chamber, whereupon higher pressure gases within the containers are expelled through the opening as the liquid pressure decreases.

3. The processing apparatus described in claim 2 including means located within the vacuum chamber for sealing the container openings as the containers are continuously advanced through the chamber.

4. The processing apparatus described in claim 3 wherein said flexible containers are heat sealable and said sealing means applies heat and pressure to the containers for sealing the openings of same.

5. The processing apparatus described in claim 3 including heat treatment apparatus through which said conveyor is adapted to travel for sterilizing said food products in the flexible containers after the container openings have been sealed.

6. The processing apparatus described in claim 5 wherein said heat treatment apparatus is a hydrostatic cooker having means defining a vertically extending water filled inlet leg, means defining a vertically extending water containing outlet leg, and means defining a steam filled chamber communicating with said inlet and outlet legs.

7. The processing apparatus described in claim 1 including means defining an auxiliary vacuum chamber connected to said liquid filled leg at said end farthest from the vacuum chamber, means for reducing the pressure within said auxiliary vacuum chamber to a predetermined sub-atmospheric level higher than the pressure in said vacuum chamber, and means defining another vertically extending liquid filled leg in communication with the auxiliary vacuum chamber and having an effective vertical height sufficient for the liquid therein to form a pressure seal balancing the less than atmospheric pressure within the auxiliary vacuum chamber against the external pressure at the opposite end of the leg whereby the pressure differential over both of said legs is cumulative, said conveyor being adapted to travel through both legs and vacuum chambers for advancing articles to be processed therein.

* * * * *